United States Patent
Türke et al.

(10) Patent No.: US 7,650,019 B2
(45) Date of Patent: Jan. 19, 2010

(54) METHOD FOR THE EARLY IDENTIFICATION OF A DEVIATION IN THE PRINTED IMAGES THAT HAVE BEEN CREATED BY A PRINTING PRESS DURING CONTINUOUS PRODUCTION

(75) Inventors: Thomas Türke, Bielefeld (DE); Harald Heinrich Willeke, Paderborn (DE)

(73) Assignee: Koenig & Bauer Aktiengesellschaft, Wurzburg (DE)

( * ) Notice: Subject to any disclaimer, the term of this patent is extended or adjusted under 35 U.S.C. 154(b) by 679 days.

(21) Appl. No.: 10/593,896

(22) PCT Filed: Mar. 15, 2005

(86) PCT No.: PCT/EP2005/051162

§ 371 (c)(1),
(2), (4) Date: Sep. 22, 2006

(87) PCT Pub. No.: WO2005/094054

PCT Pub. Date: Oct. 6, 2005

(65) Prior Publication Data

US 2008/0212844 A1    Sep. 4, 2008

(30) Foreign Application Priority Data

Mar. 23, 2004  (DE) .................. 10 2004 014 547

(51) Int. Cl.
*G06K 9/00* (2006.01)

(52) U.S. Cl. .................. 382/112; 382/167; 382/100; 358/1.9; 250/559.2

(58) Field of Classification Search .......... 382/112, 382/149, 162, 165, 167; 358/1.9, 518, 465, 358/474; 250/559.2
See application file for complete search history.

(56) References Cited

U.S. PATENT DOCUMENTS

| 4,685,139 | A |   | 8/1987 | Masuda et al. |
| 5,081,523 | A | * | 1/1992 | Frazier ....................... 348/178 |
| 5,182,721 | A | * | 1/1993 | Kipphan et al. ............. 382/112 |
| 5,333,069 | A | * | 7/1994 | Spence ....................... 358/517 |
| 5,712,921 | A |   | 1/1998 | Zabele |

FOREIGN PATENT DOCUMENTS

| DE | 34 33 493 A1 | 4/1985 |
| DE | 40 23 320 A1 | 1/1992 |
| DE | 199 40 879 A1 | 3/2001 |

OTHER PUBLICATIONS

"Sicherung der Qualitat vor Serieneinsatz," TU Munchen Unversitatsbibliothek, 1986.

* cited by examiner

*Primary Examiner*—Vikkram Bali
*Assistant Examiner*—Ali Bayat
(74) *Attorney, Agent, or Firm*—Jones, Tullar & Cooper, P.C.

(57) ABSTRACT

A method is used for the early identification of a deviation in the printed images which have been formed by a printing press during continuous production. A second decision threshold is provided, in addition to a decision regarding good or bad print quality. A current printed image, that has been captured, is compared with a reference image. If the current image deviates from the reference image, that deviation is evaluated using two decision thresholds.

15 Claims, 3 Drawing Sheets

METHOD FOR THE EARLY IDENTIFICATION OF A DEVIATION IN THE PRINTED IMAGES THAT HAVE BEEN CREATED BY A PRINTING PRESS DURING CONTINUOUS PRODUCTION

CROSS-REFERENCE TO RELATED APPLICATIONS

This patent application is the U.S. national phase, under 35 USC 371, of PCT/EP2005/051162, filed Mar. 15, 2005; published as WO 2005/094054 A1 on Oct. 6, 2005 and claiming priority to DE 10 2004 014 547.4, filed Mar. 23, 2004, the disclosures of which are expressly incorporated herein by reference.

FIELD OF THE INVENTION

The present invention is directed to a method for the early detection of a deviation in printed images produced by a printing press during an ongoing production of the printing press. An actually recorded printed image is compared with a reference image. A decision regarding a good or poor print quality is also made.

BACKGROUND OF THE INVENTION

Printed images produced by a printing press have been checked, for a considerable length of time, for their respective quality by the operators of printing presses. A classification of the printed images into good or poor quality is performed in the course of this quality checking. The printed image of these printed products is classified as being either good or poor, with a poor image typically containing errors.

A method for detecting and for controlling the quality of printed products, in particular during the printing process, is known from DE 40 23 320 A1. An evaluation of each sheet takes place in a primary phase, which assigns the classification "good" or "poor" to each sheet. After the detection of a sheet containing an error, in a secondary phase three actual color images of the printed product are additionally employed, with the aid of an expert system, for the determination of the type of error. An alarm signal is triggered if a preset number of sheets, with such errors, is exceeded.

A method for comparing the printed image of detected images with a reference image is disclosed in DE 199 40 879 A1. The images to be compared are digitized in the form of pixel data and are stored.

SUMMARY OF THE INVENTION

The present invention is directed to the object of providing a method for use in the early detection of a deviation in printed images produced in a printing press, in the course of an ongoing production.

In accordance with the present invention, this object is attained by detecting an error in printed images generated by a printing press. The error is detected by comparing at least one of the printed images, which has been recorded using a line-scanning camera in the course of ongoing production, with a reference image. An amplitude level of individual color channels is determined for the actual recorded image and also for the reference image with regard to a pixel field containing several pixels. The reference image is determined by a maximum value, and a minimum value of each pixel in the pixel field. A deviation between an amplitude value for a recorded pixel and the maximum or minimum value for each pixel is determined for each pixel. The determined deviation is evaluated for detecting the error.

The advantages to be obtained by the present invention consist, in particular, in that a slowly accumulating error in an ongoing printing process can be detected at an early stage. Its cause can then be removed by the operators by the use of countermeasures which are performed manually, or in an automated way. These countermeasures can be employed before the quality of the printed products assumes a state which would be classified as poor and in which state the printing process would result in a production of printed products which contain errors and cannot be sold. The decision threshold, which is provided in addition to a decision regarding a good or poor print quality, makes it possible that a slight deviation of printed images, which are being produced in the ongoing printing process, which slight deviation is still inside a tolerance range, is signaled before this slight deviation has the opportunity to build up into a critical error. Because of this detection, it is possible to take suitable countermeasures early on in the printing without this deviation eventually resulting in a production of printed products of poor quality. Moreover, the possibility for a separate adjustment of the warning threshold and the error threshold has the particular advantage that a distance between these two decision thresholds can be matched to the requirement of the respective production by the operators. This is beneficial because it may be necessary, in connection with different printed products, to set their permissible print deviations differently within defined tolerances. This may be desirable because the quality requirements of these different printed products, which have been produced on the same printing press, can be different from each other.

BRIEF DESCRIPTION OF THE DRAWINGS

A preferred embodiment of the present invention is represented in the drawings and will be described in greater detail in what follows.

Shown are in.

DESCRIPTION OF THE PREFERRED EMBODIMENT

Figure 1:
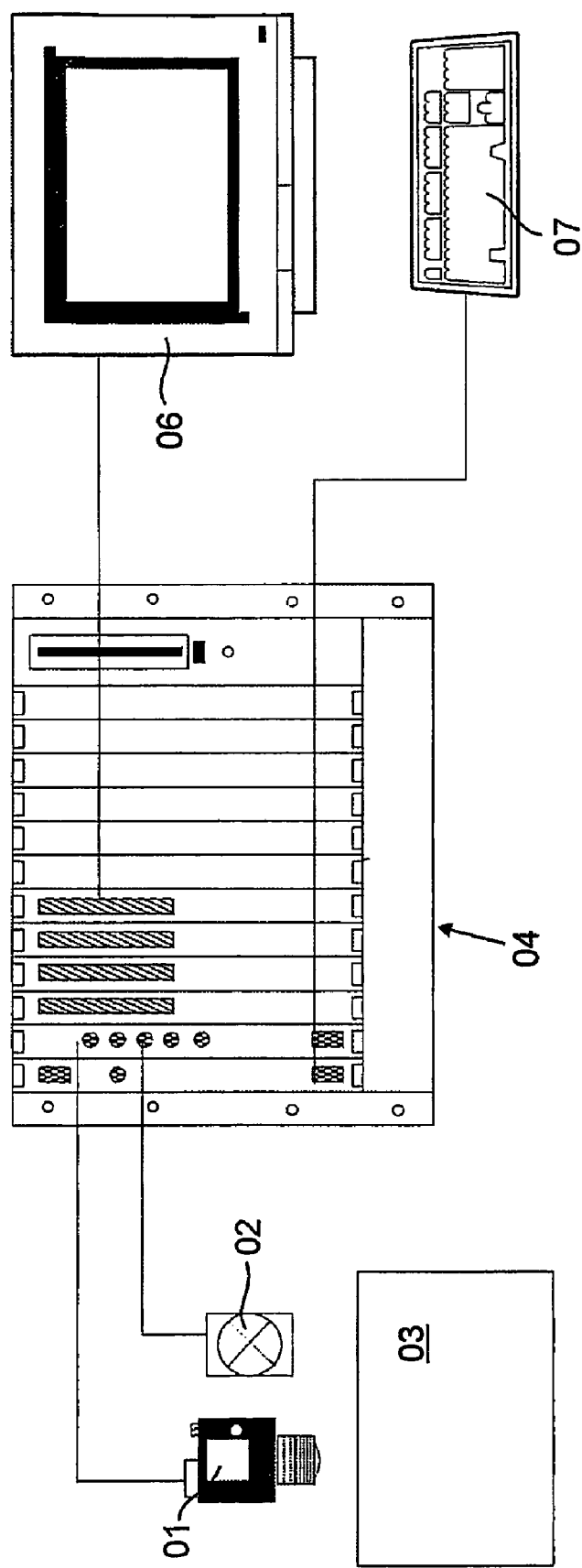
FIG. 1, a schematic representation of an inspection system in accordance with the present invention, in FIG. 2, a two-dimensional representation of a pixel field, in FIG. 3, a graphical representation of a reference image, with minimum and maximum values for each pixel, in FIG. 4, a graphical representation of a comparison of an actually recorded print image with a reference image, and in FIG. 5, a graphical representation of an evaluation of a deviation from the reference image by the use of two decision thresholds.

As seen in FIG. 1, which is a schematic representation of an inspection system, such an inspection system which, in accordance with the present invention, is particularly suited for checking a printed image, has one or several line-scanning color cameras 01, which are coupled with each other. Alternatively, the system may use an area-scanning color camera 01. Either camera 01 records a printed image 03, which image is illuminated by an illumination arrangement 02. The printed image 03 has been generated by a printing press on an imprinted material consisting, for example, of paper. Amplitude values Axy of the individual color channels, which have been formed from the recording of the image by the line-scanning color camera 01 or the area-scanning color camera 01, are calculated in an image processing system 04. Output of the results is provided, for example, on a monitor 06 which is connected with the image processing system 04. Inputs of, for example, parameters of which the image processing system 04 needs to be informed for its calculations, are entered via a keyboard 07 which is connected to the image processing system 04.

In the course of a learning phase, and which occurs during a production of the printed product by the printing press, and which production has been classified as good, the image processing system 04 uses the amplitude values Axy from the line-scanning color camera 01 or the area-scanning color camera 01 to compute a reference image.

Figure 2:
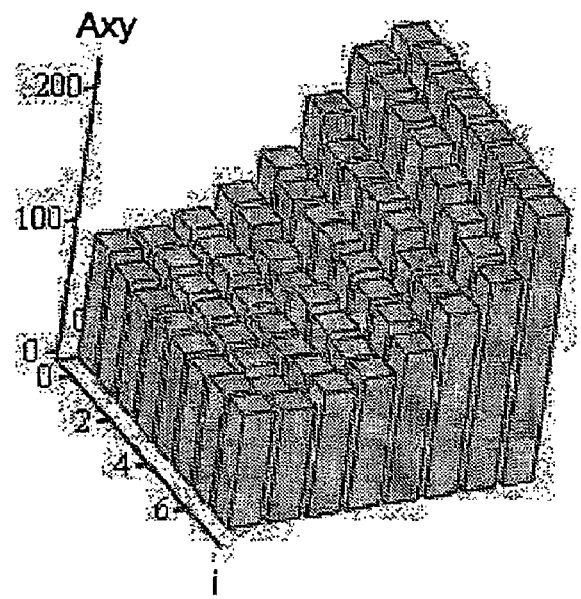

FIG. 2 shows a two-dimensional representation of a three-dimensional pixel field, such as, for example, a square one, resulting from the representation of the printed image. The basic surface of the pixel field consists, for example, of 8×8 pixels, and the amplitude values Axy of the pixel field have been applied to the upward ordinate axis. For reasons of simplicity, in the discussion which follows, the data taken or derived from the pixel field will only be represented for a one-dimensional area of a single line of, for example, eight pixels i, wherein i=0 to 7.

Figure 3:
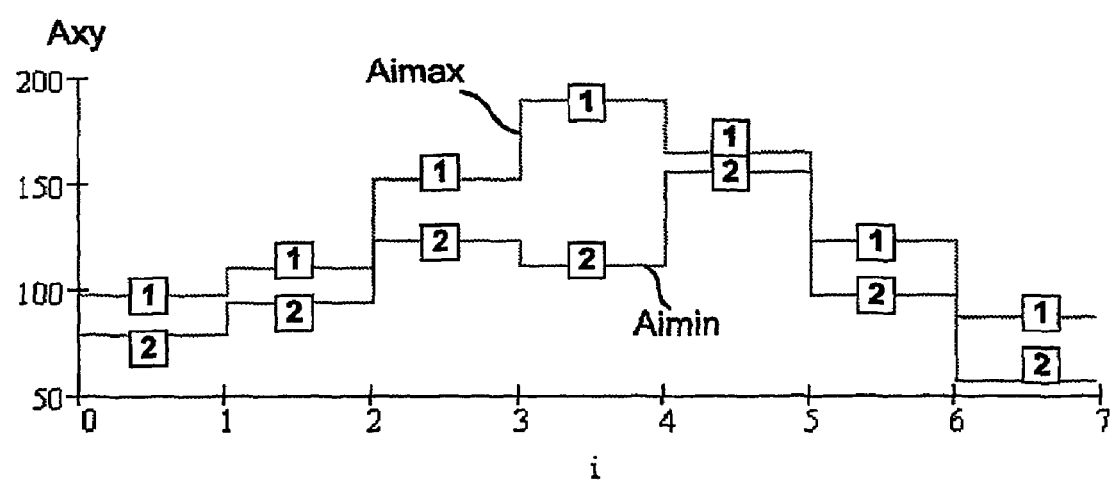
Figure 4:
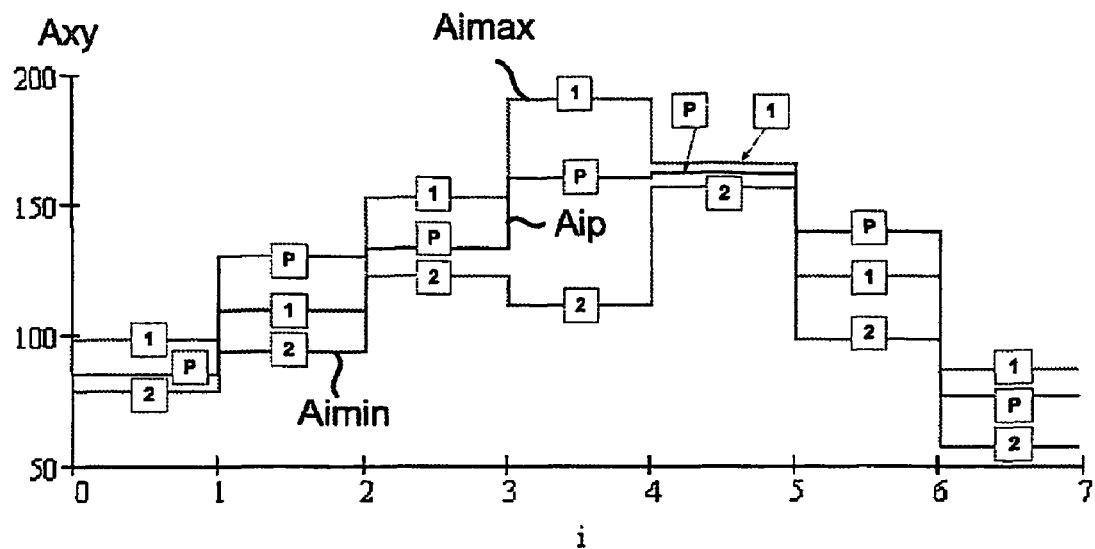

FIG. 3 shows a reference image, which preferably has been generated from several recordings, with the respective maximum values Aimax and minimum values Aimin of each pixel i. Subsequently, the amplitude values Aip of the actually recorded printed image are compared with this reference image consisting of the course of the respective maximum values Aimax and minimum values Aimin, the deviations of the actually recorded printed image from the several recorded reference images are determined, such as is shown in FIG. 4. In the course of the comparison of the amplitude values Aip of the actually recorded printed image with its reference image. A contrast AK with the reference image in particular is evaluated for each deviation.

Figure 5:
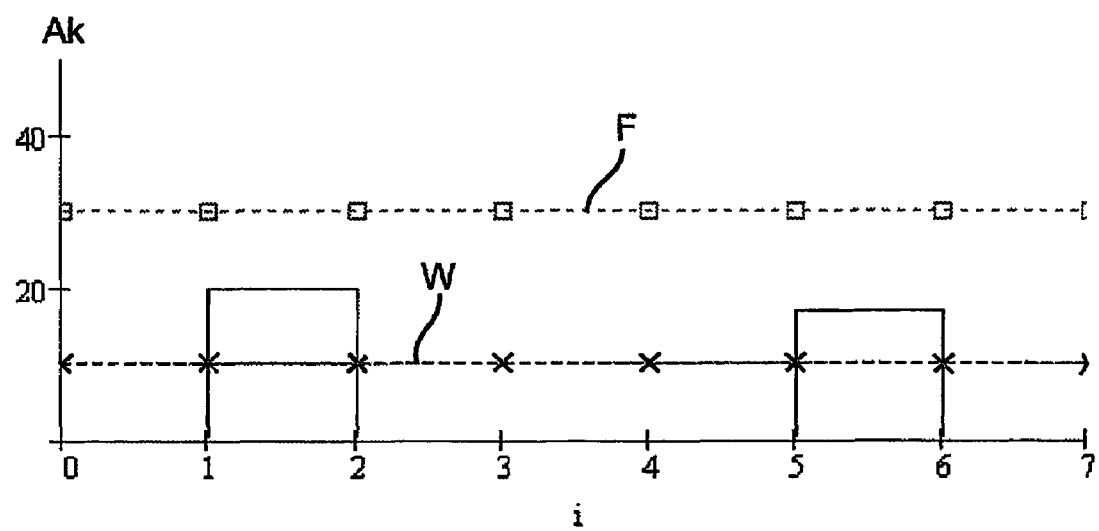

A determination of the deviation between the actually recorded printed image and the reference image takes place via two decision thresholds W and F, which must be set separately. One decision threshold forms a warning threshold W. The other decision threshold forms an error threshold F, both as are depicted in FIG. 5. In this way, each one of the two decision thresholds can be set independently of the respectively other one. As soon as the deviation, i.e. in particular the contrast AK of the actually recorded printed image, with the reference image, for one or for several pixels "i" lies above the warning threshold W, but still lies below the error threshold F, a warning is issued for this particular image area. As soon as the deviation, and in particular, the contrast AK of the actual printed image with the reference image, for a specific pixel "i," lies above the error threshold F, this image area is rated as an error. Therefore, the difference between a warning and an error takes place by the use of the amount of the deviation, with respect to the learned reference.

A further evaluation can also take place by use of the number of warnings or of errors in regard to pixels "i" in a local neighborhood. If, for example, only a single pixel "i" deviates from the learned reference, this is a warning or an error of small size or importance and can possibly be neglected. For this reason, consideration of the size or of the importance of the warning and/or of the error is subsequently taken. A check is made, in the course of this consideration, whether, for example, in an 8×8 pixel field, several pixels "i" stand out of the reference in close vicinity, and together result in a larger deviation, with respect to the area. In this way, it is possible to determine not only a deviation, and in particular the contrast AK as such, but also to determine an area in which a deviation from the learned reference image exists. This area can be set with respect to its decision thresholds W and F. The number of deviations in the evaluated area, starting at which either a warning or an error is generated or is displayed, can be determined by the use of adjustable threshold values W and F.

To insure that during this examination, errors of a high contrast AK, but of a small size, are not being missed, the area above the error threshold F is also determined. If, in the course of this determination, an adjustable value, a so-called error weight FG, is exceeded in a local area of, for example, 8×8 pixels, an error is reported regardless of the deviation of the area of the deviation in the contrast AK.

The display of deviations takes place at the monitor 06, and may be, for example, separated as to the type of deviation, preferably in different colors. The display on the monitor 06 is preferably superimposed, in a positionally accurate manner, on the actual printed image.

During an ongoing production of the printing press, by use of this method in accordance with the present invention, the operator is placed into a position of detecting immediately in which printing group the reason for a deviation in quality of the printed product occurs. It is then possible to evaluate the reason for the deviation, and to correct it.

While a preferred embodiment of a method for the early identification of a deviation in a printed image that has been produced by a printing press, during continuous production, in accordance with the present invention, has been set forth fully and completely hereinabove, it will be apparent to one of skill in the art that various changes in, for example, the printing press used to provide the printed images, the specific type of camera or cameras used, and the like could be made without departing from the true spirit and scope of the present invention, which is accordingly to be limited only by the appended claims.

What is claimed is:

1. A method for detecting an error in printed images generated by a printing press including:
   providing a scanning color camera;
   using said scanning color camera for recording a reference image having a reference image pixel field consisting of several reference image pixels;
   determining a maximum value and a minimum value of amplitude values of said several reference image pixels in said reference image pixel field;
   storing said maximum value and said minimum value of each said reference image pixel as its reference image;
   producing a plurality of actual printed images in the course of an ongoing printing process using said printing press;
   using said scanning color camera for recording said actual images having an actual image pixel field consisting of several actual image pixels;
   determining a maximum value and a minimum value of amplitude values of said several actual image pixels in said actual image pixel field;
   determining a deviation between said reference image pixel amplitude value and said actual image pixel amplitude value;
   providing a first, lower decision threshold value for said deviation and a second, higher decision threshold value for said deviation; and
   classifying said printed product as having poor quality when said deviation exceeds both of said first and second decision values.

2. The method of claim 1 further including providing said first lower decision threshold, with a lower deviation, constituting a warning threshold and providing said second upper decision threshold, with a higher deviation, constituting an error threshold.

3. The method of claim 2 further including, by adjusting said first and second thresholds, determining a value for generating either said warning or said error.

4. The method of claim 2 further including generating a warning report when said warning threshold is reached.

5. The method of claim 2 further including generating an error report when said error threshold is reached.

6. The method of claim 2 further including issuing a warning when said deviation is between said warning threshold and said error threshold.

7. The method of claim 1 further including determining a contrast between said actually recorded printed image and said reference image and evaluating said contrast as a deviation between said actually recorded printed image and said reference image.

8. The method of claim 2 further including determining whether several pixels in said actual image pixel field exceed one of said warning threshold and said error threshold.

9. The method of claim 8 further including determining said pixel field by selecting several pixels arranged adjacent each other and having said amplitude values showing a deviation from said reference value.

10. The method of claim 9 further including determining said area of said pixel field where said deviation lies above said error threshold.

11. The method of claim 1 further including setting an error weight for a local area of said pixel field, said error weight constituting a value for all of said deviations which are permissible in said local area of said pixel field, and reporting an error when said error weight is exceeded.

12. The method of claim 1 further including providing a monitor and providing a display of said deviation on said monitor.

13. The method of claim 12 further including displaying said deviation on said monitor and superimposing said display on a display of said actual printed image.

14. The method of claim 12 further including using said display and showing a deviation in a quality of said actual printed image.

15. The method of claim 1 further including providing said scanning camera as one of a line-scanning camera and an area-scanning camera.

* * * * *